US012659178B2

(12) United States Patent
Huang et al.

(10) Patent No.: US 12,659,178 B2
(45) Date of Patent: Jun. 16, 2026

(54) CONSORTIUM BLOCKCHAIN ADMISSION MANAGEMENT METHOD AND APPARATUS

(71) Applicant: CHINA UNIONPAY CO., LTD., Shanghai (CN)

(72) Inventors: Yan Huang, Shanghai (CN); Zhichen Tong, Shanghai (CN); Yong Min, Shanghai (CN); Yu Zhou, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 19/136,423

(22) PCT Filed: Oct. 20, 2023

(86) PCT No.: PCT/CN2023/125669
§ 371 (c)(1),
(2) Date: Jun. 6, 2025

(87) PCT Pub. No.: WO2024/139578
PCT Pub. Date: Jul. 4, 2024

(65) Prior Publication Data
US 2026/0012365 A1 Jan. 8, 2026

(30) Foreign Application Priority Data

Dec. 30, 2022 (CN) .......................... 202211720813.9

(51) Int. Cl.
*H04L 9/00* (2022.01)
*H04L 9/08* (2006.01)
(Continued)

(52) U.S. Cl.
CPC ............ *H04L 9/40* (2022.05); *H04L 2209/56* (2013.01)

(58) Field of Classification Search
CPC ..... H04L 9/40; H04L 2209/56; H04L 9/0894; H04L 9/3263; H04L 9/50
See application file for complete search history.

(56) References Cited

U.S. PATENT DOCUMENTS

| | | | |
|---|---|---|---|
| 11,138,323 B2 * | 10/2021 | Xu ........................ | H04L 9/3239 |
| 2020/0374106 A1 * | 11/2020 | Padmanabhan ..... | H04L 63/0428 |

(Continued)

FOREIGN PATENT DOCUMENTS

| | | |
|---|---|---|
| CN | 109493063 A | 3/2019 |
| CN | 112508562 A | 3/2021 |

(Continued)

OTHER PUBLICATIONS

English translation of International Search Report and Written Opinion issued in PCT/CN2023/125669, mailed Jan. 10, 2023.

*Primary Examiner* — Andrew Suh
(74) *Attorney, Agent, or Firm* — Meunier Carlin & Curfman LLC

(57) ABSTRACT

Provided in the embodiments of the present application are a consortium blockchain admission management method and apparatus. The method includes: for each first-level node which has a direct access control permission for a basic admission management component, in response to a hosting transaction, which is initiated by the first-level node toward the basic admission management component, the basic admission management component constructing a corresponding second-level institution contract; and when the second-level institution contract is in a cooperation mode, in response to a node admission transaction, which is initiated by an initial second-level node toward the second-level institution contract, adjusting second-level nodes, wherein each second-level node has an indirect access control permission for the basic admission management component and can join a blockchain network, and the second-level insti- (Continued)

tution contract realizes multi-level node admission manage-
ment by means of multi-level expansion.

12 Claims, 4 Drawing Sheets

(51) Int. Cl.
  H04L 9/32          (2006.01)
  H04L 9/40          (2022.01)

(56)          References Cited

U.S. PATENT DOCUMENTS

2021/0160074 A1*  5/2021  Kumaresan ........... H04L 9/0877
2022/0253961 A1*  8/2022  Spangenberg ....... G06Q 50/184
2023/0262126 A1*  8/2023  Liu ........................... H04L 9/50
                                                   709/203

FOREIGN PATENT DOCUMENTS

CN          112511350  A      3/2021
CN          112564913  A      3/2021
CN          113660206  A     11/2021
CN          116015929  A      4/2023
WO        2021032138  A1      2/2021

* cited by examiner for each first-level node that has a direct access control permission to a basic admission management component, in response to an escrow transaction initiated by the first-level node to the basic admission management component;constructing, by the basic admission management component, a second-level institutional contract corresponding to the first-level node after a consensus is reached on the escrow transaction and the escrow transaction is recorded on a blockchain; wherein the first-level node is an initial second-level node of the second-level institutional contract

S101 when the second-level institutional contract is in a collaboration mode, in response to a node admission transaction initiated by the initial second-level node to the second-level institutional contract, adjusting a second-level node of the second-level institutional contract; wherein the adjusting include: adding, deleting, freezing, and unfreezing, each second-level node has an indirect access control permission to the basic admission management component and can participate in a blockchain network, and the second-level institutional contract implements multi-level node admission management through multi-level extension

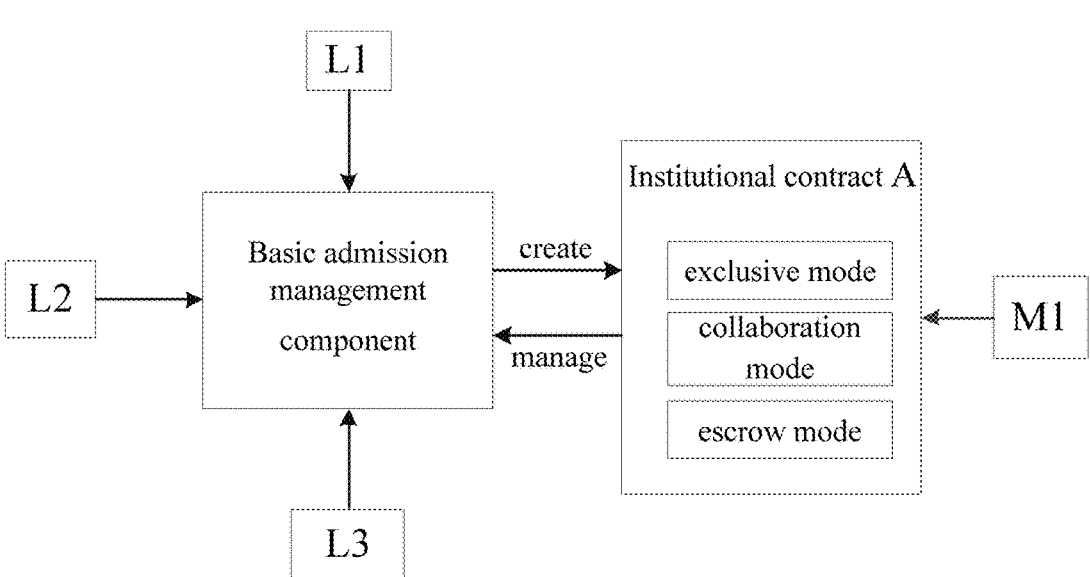

CONSORTIUM BLOCKCHAIN ADMISSION MANAGEMENT METHOD AND APPARATUS

CROSS REFERENCE TO RELATED APPLICATIONS

The present application is a US National Stage of International Application No. PCT/CN2023/125669, filed on Oct. 20, 2023, which claims the priority of Chinese Patent Application No. 202211720813.9 filed with the China National Intellectual Property Administration on Dec. 30, 2022 and entitled "Consortium Blockchain Admission Management Method and Apparatus", the entire content of which is hereby incorporated by reference.

TECHNICAL FIELD

The present invention relates to the field of blockchain technology, and in particular, to a consortium blockchain admission management method and apparatus.

BACKGROUND

A consortium blockchain is a system form between public and private blockchains, which is often controlled by multiple centers. Several organizations work together to maintain a consortium blockchain, and only nodes with access control permissions can participate in the consortium blockchain network.

The admission management mechanism is the core feature of the consortium blockchain system, which is used to manage the access control of nodes in the blockchain network layer and consensus layer. The current consortium blockchain admission management method is mainly based on the traditional Certification Authority (CA) certificate. However, it is more complicated to use, and its security risks also increase step by step when multi-level expansion management is implemented.

SUMMARY

The embodiments of the present application provide a consortium blockchain admission management method and apparatus for hierarchical management of blockchain nodes of the consortium blockchain.

In a first aspect, the embodiments of the present application provide a consortium blockchain admission management method, including:

for each first-level node having a direct access control permission to a basic admission management component, in response to an escrow transaction initiated by the first-level node to the basic admission management component; constructing, by the basic admission management component, a second-level institutional contract corresponding to the first-level node after a consensus is reached on the escrow transaction and the escrow transaction is recorded on a blockchain; wherein the first-level node is an initial second-level node of the second-level institutional contract;

when the second-level institutional contract is in a collaboration mode, in response to a node admission transaction initiated by the initial second-level node to the second-level institutional contract, adjusting a second-level node of the second-level institutional contract, wherein the adjusting comprises: adding, deleting, freezing, and unfreezing, and each second-level node has an indirect access control permission to the basic admission management component and is capable of participating in a blockchain network; and the second-level institutional contract implements multi-level node admission management through multi-level extension.

Through multi-level admission control management, the present application can better adapt to the hierarchical admission management needs when the scale of the organization itself and the scale of blockchain nodes expand; compared with a blockchain access control method under a traditional CA certificate system, the present application makes the admission management operation simpler through hierarchical expansion by only focusing on an organization at current-level on the blockchain needs; in the present application, a control strategy from the outside to the inside is adopted, resulting in a better robustness and higher security of the access management mechanism.

Optionally, after in response to the escrow transaction initiated by the first-level node to the basic admission management component, constructing the second-level institutional contract corresponding to the first-level node through the basic admission management component, the method further includes:

taking, by the basic admission management component, an account of the first-level node as an initial account in an account system of the second-level institutional contract, and deleting the account of the first-level node from an account system of the basic admission management component.

Optionally, for each second-level node of the second-level institutional contract, when the second-level institutional contract is in the collaboration mode, in response to a node admission transaction initiated by the second-level node to the basic admission management component through the second-level institutional contract, adjusting a first-level node of the basic admission management component.

Optionally, in response to a node admission transaction initiated by the second-level institutional contract, or by the second-level institutional contract in collaboration with at least one first-level node of the basic admission management component to the basic admission management component, adjusting a first-level node of the basic admission management component.

Optionally, an initial mode of the second-level institutional contract is an exclusive mode; after in response to the escrow transaction initiated by the first-level node to the basic admission management component, constructing the second-level institutional contract corresponding to the first-level node, the method further includes:

in response to a mode switching operation initiated by the initial second-level node to the second-level institutional contract, switching from the exclusive mode to the collaboration mode or an escrow mode.

Through mode switching, institutions at all levels can carry out necessary management and control, while delegating power step by step, the potential risks brought about by the extension of layers can also be controlled.

Optionally, for each i-level node of an i-level institutional contract, when the i-level institutional contract is in an escrow mode, in response to an escrow transaction initiated by the i-level node to the i-level institutional contract, constructing an (i+1)-level institutional contract corresponding to the i-level node through the i-level institutional contract; wherein the i-level node is an initial (i+1)-level node of the (i+1)-level institutional contract, and the initial (i+1)-level node has an indirect access control permission to the basic admission management component and a contract institution between the basic admission management component and the (i+1)-level institutional contract, and the initial (i+1)-level nodes is capable of participating in the blockchain network, wherein i is a positive integer greater than or equal to 2.

Optionally, when the (i+1)-level institutional contract is in the collaboration mode, in response to a node admission transaction initiated by the initial (i+1)-level node to the (i+1)-level institutional contract, adjusting an (i+1)-level node of the (i+1)-level institutional contract, wherein each (i+1)-level node has an indirect access control permission to the basic admission management component and an institutional contract with an escrow relationship between the basic admission management component and the (i+1)-level institutional contract, wherein the (i+1)-level nodes is capable of participating in the blockchain network.

Compared with the admission management mechanism based on the centralized CA system, the adoption of an outside-in control strategy makes the admission mechanism of this the present application have better robustnees and higher security.

Optionally, when the i-level institutional contract is in the collaboration mode, in response to a node admission transaction initiated by the initial (i+1)-level node to the i-level institutional contract through the (i+1)-level institutional contract, adjusting an i-level node of the i-level institutional contract.

Optionally, when the i-level institutional contract is in the collaboration mode, in response to a node admission transaction initiated by the (i+1)-level institutional contract, or by the (i+1)-level institutional contract in coordination with at least one i-level node of the i-level institutional contract to the i-level institutional contract, adjusting an i-level node of the i-level institutional contract.

In a second aspect, the embodiments of present application provide a consortium blockchain admission management apparatus, including:

a response module, configured, for each first-level node having a direct access control permission to a basic admission management component, in response to an escrow transaction initiated by the first-level node to the basic admission management component, to construct a second-level institutional contract corresponding to the first-level node through the basic admission management component after a consensus is reached on the escrow transaction and the escrow transaction is recorded on the blockchain, wherein the first-level node is an initial second-level node of the second-level institutional contract;

an adjustment module, configured, when the second-level institutional contract is in a collaboration mode, in response to a node admission transaction initiated by the initial second-level node to the second-level institutional contract, to adjust a second-level node of the second-level institutional contract; wherein the adjust includes: adding, deleting, freezing, and unfreezing, and each second-level node has an indirect access control permission to the basic admission management component and is capable of participating in a blockchain network; wherein the second-level institutional contract implements multi-level node admission management through multi-level extension.

Through multi-level admission control management, the present application can better adapt to the hierarchical admission management needs when the scale of the institution itself and the scale of blockchain nodes expand; compared with the blockchain access control method under the traditional CA certificate system, the present application makes the admission management operation simpler through hierarchical expansion by only focusing on an organization at current-level on the blockchain; in the present application, a control strategy from the outside to the inside is adopted, resulting in a better robustness and higher security of the access management mechanism.

Optionally, the response module is further configured to:

take, by the basic admission management component, an account of the first-level node as an initial account in an account system of the second-level institutional contract, and delete the account of the first-level node from an account system of the basic admission management component.

Optionally, the adjustment module is further configured to:

for each second-level node of the second-level institutional contract, when the second-level institutional contract is in the collaboration mode, in response to a node admission transaction initiated by the second-level node to the basic admission management component through the second-level institutional contract, adjust a first-level node of the basic admission management component.

Optionally, the adjustment module is further configured to:

the initial mode of the second-level institutional contract is an exclusive mode;

after in response to the escrow transaction initiated by the first-level node to the basic admission management component, construct the second-level institutional contract corresponding to the first-level node, further including:

in response to a mode switching operation initiated by the initial second-level node to the second-level institutional contract, switching from the exclusive mode to the collaboration mode or an escrow mode.

Through mode switching, institutions at all levels can carry out necessary management and control, while delegating power step by step, the potential risks brought about by the extension of layers can also be controlled.

Optionally, the adjustment module is further configured to:

for each i-level node of an i-level institutional contract, when the i-level institutional contract is in an escrow mode, in response to an escrow transaction initiated by the i-level node to the i-level institutional contract, construct an (i+1)-level institutional contract corresponding to the i-level node through the i-level institutional contract, where the i-level node is an initial (i+1)-level node of the (i+1)-level institutional contract, and the initial (i+1)-level node has an indirect access control permission to the basic admission management component and a contract institution between the basic admission management component and the (i+1)-level institutional contract, and the initial (i+1)-level node is capable of participating in the blockchain network, herein i is a positive integer greater than or equal to 2.

Optionally, the adjustment module is further configured to:

when the (i+1)-level institutional contract is in a collaboration mode, in response to the node admission transaction initiated by the initial (i+1)-level node to the (i+1)-level institutional contract, adjust an (i+1)-level node of the (i+1)-level institutional contract. Each (i+1)-level node has an indirect access control permission to the basic admission management component, and to an institutional contract with an escrow relationship between the basic admission management component and the (i+1)-level institutional contract, and the (i+1)-level node is capable of participating in the blockchain network.

Compared with the admission management mechanism based on the centralized CA system, the adoption of an outside-in control strategy makes the admission mechanism of the present application have better robustnees and higher security.

Optionally, the adjustment module is further configured to:

when the i-level institutional contract is in the collaboration mode, in response to a node admission transaction initiated by an initial (i+1)-level node to the i-level institutional contract through the (i+1)-level institutional contract, adjust an i-level node of the i-level institutional contract.

Optionally, the adjustment module is further configured to:

when the i-level institutional contract is in the collaboration mode, in response to a node admission transaction initiated by the (i+1)-level institutional contract in coordination with at least one i-level node of the i-level institutional contract to the i-level institutional contract, adjust the i-level node of the i-level institutional contract.

In a third aspect, the embodiments of present application provide a computer device, including: a memory, a processor and a computer program stored in the memory and executable on the processor. The processor executes the computer program to implement the consortium blockchain admission management method according to the first aspect.

In a fourth aspect, the embodiments of present application provide a computer-readable storage medium, storing a computer program executable by a computer device, and configured to enable the computer device to perform the consortium blockchain admission management method according to the first aspect when the computer program is run on the computer device.

BRIEF DESCRIPTION OF FIGURES

In order to more clearly illustrate the technical solutions in the embodiments of the present invention, the drawings required for use in the description of the embodiments will be introduced below briefly. Obviously, the drawings described below are only some embodiments of the present invention, and those ordinarily skilled in the art can further obtain other drawings according to these drawings without inventive efforts.

FIG. 1 is a schematic flow chart of a consortium blockchain admission management method according to an embodiment of the present application.

FIG. 2 is a schematic diagram of a consortium blockchain admission management architecture according to an embodiment of the present application.

DETAILED DESCRIPTION

Figure 3:
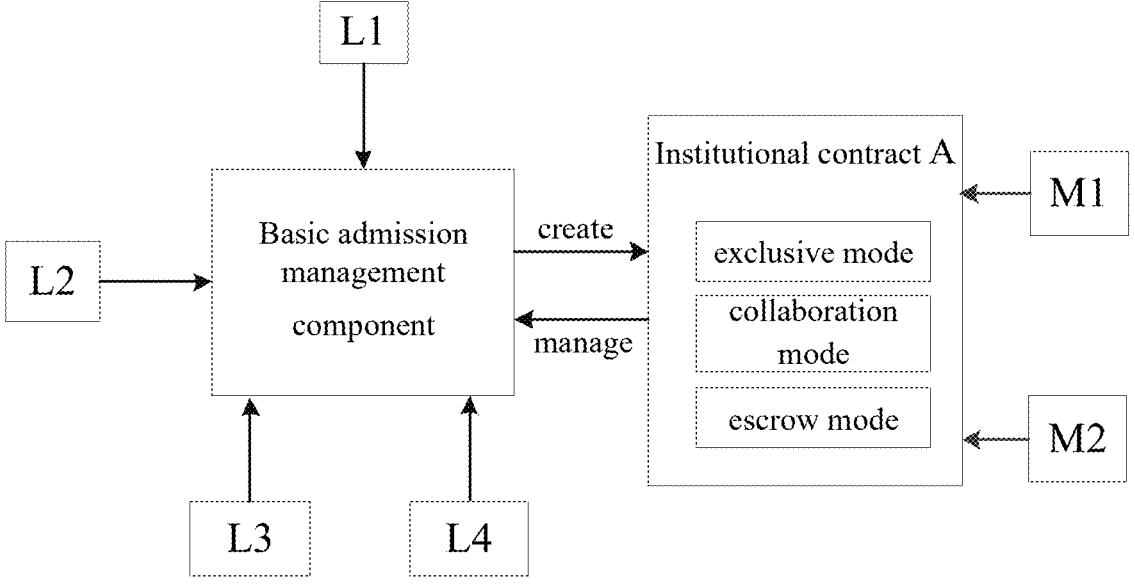
FIG. 3 is a schematic diagram of a consortium blockchain admission management architecture according to an embodiment of the present application.

In order to make the objectives, technical solutions and advantages of the embodiments of the present invention clearer, the present invention is further described in detail below in conjunction with the drawings and the embodiments. It should be understood that the embodiments described herein are only used to explain the present invention and are not intended to limit the present invention.

The present application embodiment provides a flow of a consortium blockchain admission management method, as shown in FIG. 1, the method includes following steps.

S101, for each first-level node that has a direct access control permission to a basic admission management component, in response to an escrow transaction initiated by the first-level node to the basic admission management component, constructing, by the basic admission management component, a second-level institutional contract corresponding to the first-level node after a consensus is reached on the escrow transaction and the escrow transaction is recorded on a blockchain; here the first-level node is an initial second-level node of the second-level institutional contract.

In the present application, the basic admission management component is a system component that integrates node admission management control logic. The node admission management control logic includes an access control operation that can be performed by the first-level node. The access control operation include adding, changing, freezing, deleting, and escrow nodes. All access control operations need to be completed through transactions, so a transaction set corresponding to all access control operations is also called a node admission transaction set.

The first-level node is the node that has the direct access control permission to the basic admission management component. All first-level nodes can initiate escrow transactions to the basic admission management component for hierarchical expansion. The basic admission management component creates and deploys a corresponding second-level institutional contract for the first-level node that initiates the escrow transaction. The basic admission management component initializes the created second-level institutional contract and uses the first-level node as the only initial second-level node for the corresponding second-level institutional contract.

S102, when the second-level institutional contract is in a collaboration mode, in response to a node admission transaction initiated by the initial second-level node to the second-level institutional contract, adjusting a second-level node of the second-level institutional contract; here the adjusting include: adding, deleting, freezing, and unfreezing, each second-level node has an indirect access control permission to the basic admission management component and is capable of participating in a blockchain network, and the second-level institutional contract implements multi-level node admission management through multi-level extension.

In the present application, the institutional contract includes three working modes, namely an exclusive mode, a collaboration mode and an escrow mode; the exclusive mode has the highest priority, the collaboration mode has a lower priority than the exclusive mode, and the escrow mode has a lower priority than the escrow mode. Among them, the exclusive mode is an initial mode of the institutional contract, that is, only the initial node of the institutional contract is the only node of the institutional contract.

When the second-level institutional contract is in the collaboration mode, the second-level node initiates a node admission transaction to the second-level institutional contract. The type of the node admission transaction includes, but is not limited to, adding, changing, freezing, unfreezing, and deleting nodes. If the node admission transaction at this time is a node addition transaction, at least one node can be newly added at the second level. The initial second-level node assigns corresponding permissions to the newly added node. The level of the permissions of each newly added node is determined according to an established rule, such as a voting mechanism. In the second level, a newly added node and a second-level node can collaborate in external management. The external management is the indirect access control of all second-level nodes to the basic admission management component. The newly added node and the second-level node also jointly determine a type of node admission transaction initiated to the basic admission management component, and the newly added node and each second-level node can participate in the blockchain network.

Through multi-level admission control management, the present application can better adapt to the hierarchical admission management needs when the scale of the organization itself and the scale of blockchain nodes expand; compared with a blockchain access control method under a traditional CA certificate system, the present application makes the admission management operation simpler through hierarchical expansion by only focusing on an organization at current-level on the blockchain needs; in the present application, a control strategy from the outside to the inside is adopted, resulting in a better robustness and higher security of the access management mechanism.

For example, in a diagram of a consortium blockchain admission management architecture shown in FIG. 2, the first-level nodes of the basic admission management component are L1, L2, L3, and M1. L1, L2, L3, and M1 all have a direct access control permission to the basic admission management component; at this time, the first-level node M1 initiates an escrow transaction to the basic admission management component, and the basic admission management component creates and deploys a second-level institutional contract A for the first-level node M1, initializes the second-level institutional contract A, and uses the first-level node M1 as an initial second-level node of the second-level institutional contract A.

When the second-level institution is in a collaboration mode, the initial second-level node M1 initiates a node admission transaction to the second-level institutional contract A to add a new second-level node M2 at the second level, and the initial second-level node M1 assigns a corresponding permission to the newly added second-level node M2; the initial second-level node M1 and the newly added second-level node M2 collaborate in external management; the initial second-level node M1 continues to initiate a node admission transaction to the second-level institutional contract A to add a new second-level node M3 at the second level, and the initial second-level node M1 assigns a corresponding permission to the newly added second-level node M3; the initial second-level node M1 and the newly added second-level nodes M2 and M3 collaborate in external management, and jointly determine a type of node admission transaction initiated to the basic admission management component.

In some embodiments, after in response to the escrow transaction initiated by the first-level node to the basic admission management component, constructing the second-level institutional contract corresponding to the first-level node through the basic admission management component, the method further includes: taking, by the basic admission management component, an account of the first-level node as an initial account in an account system of the second-level institutional contract, and deleting the account of the first-level node from an account system of the basic admission management component.

In the present application, the basic admission management component initializes the created second-level institutional contract, takes the first-level node as the only initial second-level node corresponding to the second-level institutional contract, takes the account of the first-level node as the initial account in the account system of the second-level institutional contract, and deletes the account of the first-level node from the account system of the basic admission management component, so that the first-level node no longer has the direct access control permission to the basic admission management component.

For example, in the diagram of the consortium blockchain admission management architecture shown in FIG. 2, the basic admission management component initializes the created second-level institutional contract A, takes the first-level node M1 as the only initial second-level node corresponding to the second-level institutional contract A, and takes the account of node M1 as the initial account in the account system of the second-level institutional contract A, and deletes the account of node M1 from the account system of the basic admission management component, so that the node M1 no longer has the direct access control permission to the basic admission management component.

In some embodiments, for each second-level node of a second-level institutional contract, when the second-level institutional contract is in the collaboration mode, in response to a node admission transaction initiated by the second-level node to a basic admission management component through the second-level institutional contract, a first-level node of the basic admission management component is adjusted.

In the present application, when the second-level institutional contract is in the collaboration mode, each second-level node can initiate a node admission transaction to the basic admission management component through the second-level institution, that is, each second-level node can indirectly adjust the first-level node on the basic admission management component.

For example, in a diagram of a consortium blockchain admission management architecture shown in FIG. 3, the first-level nodes of the basic admission management component are L1, L2, and L3; the second-level nodes of the second-level institutional contract A are M1 and M2. When the second-level institutional contract A is in the collaboration mode, the second-level node M2 can initiate a node admission transaction to the basic admission management component through the second-level institutional contract A to add a first-level node L4.

In some embodiments, in response to a node admission transaction initiated by the second-level institutional contract, or by the second-level institutional contract in collaboration with at least one first-level node of the basic admission management component to the basic admission management component, a first-level node of the basic admission management component is adjusted.

In the present application, the second-level institutional contract can independently initiate a node admission transaction to the basic admission management component; the second-level institutional contract can also collaborate with at least one first-level node of the basic admission management component to initiate a node admission transaction to the basic admission management component, to jointly adjust the first-level node of the basic admission management component.

Figure 4:
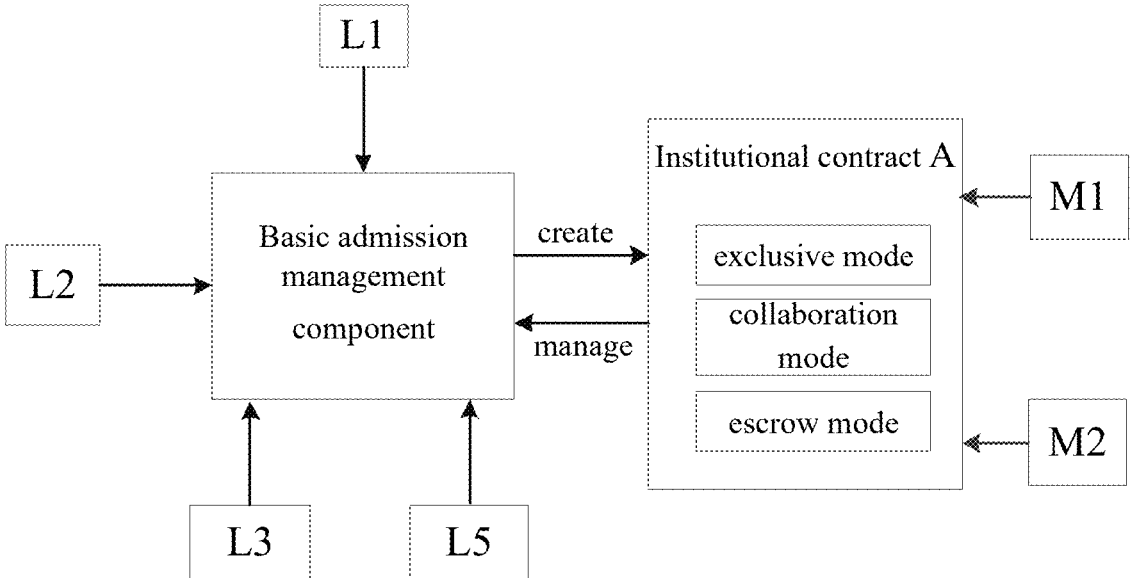
FIG. 4 is a schematic diagram of a consortium blockchain admission management architecture according to an embodiment of the present application.

For example, in a diagram of a consortium blockchain admission management architecture shown in FIG. 4, the first-level nodes of the basic admission management component are L1, L2, and L3; the second-level nodes of the second-level institutional contract A are M1 and M2. When the second-level institutional contract A is in a collaboration mode, the second-level node M1 and the first-level node L1 work together to initiate a node admission transaction to the basic admission management component to add a first-level node L5.

In some embodiments, the initial mode of the second-level institutional contract is an exclusive mode; after in response to the escrow transaction initiated by the first-level node to the basic admission management component, constructing the second-level institutional contract corresponding to the first-level node, the method further includes: in response to a mode switching operation initiated by the initial second-level node to the second-level institutional contract, switching from the exclusive mode to the collaboration mode or an escrow mode.

In the present application, the initial node of the institutional contract can act as an institutional administrator and initiate a mode switching operation to the second-level institutional contract to achieve the switching of the working mode, that is, it can switch from the exclusive mode to the collaboration mode, from the collaboration mode to the escrow mode, from escrow mode back to the collaboration mode, or from the collaboration mode back to the exclusive mode.

Through mode switching, institutions at all levels can carry out necessary management and control, which can decentralize power step by step while controlling the potential risks brought about by the extension of layers.

In some embodiments, the initial node of the institutional contract can self-destruct through the institutional contract. After the initial node self-destructs, the mode switching of the institutional contract becomes irreversible; in addition, the initial node will no longer have the permission to access a contract at current level and the blockchain network.

In some embodiments, the second-level institutional contract supports multi-level extended admission management, including: for each i-level node of an i-level institutional contract, when the i-level institutional contract is in an escrow mode, in response to an escrow transaction initiated by the i-level node to the i-level institutional contract, an (i+1)-level institutional contract corresponding to the i-level node is constructed through the i-level institutional contract. The i-level node is an initial (i+1)-level node of the (i+1)-level institutional contract, and the initial (i+1)-level node has an indirect access control permission to the basic admission management component and to a contract institution between the basic admission management component and the (i+1)-level institutional contract, and the initial (i+1)-level node can participate in the blockchain network, herein i is a positive integer greater than or equal to 2.

In the present application, when i is equal to 2, when the second-level institutional contract is in the collaboration mode, each second-level node on the second-level institutional contract can initiate an escrow transaction to the second-level institutional contract. At this time, the second-level institutional contract switches from the collaboration mode to an escrow mode. The second-level institutional contract constructs a third-level institutional contract for each second-level node that initiates an escrow transaction. Each second-level node that initiates the escrow transaction is an initial third-level node of a corresponding third-level institutional contract. The initial third-level node has an indirect access control permission to the basic admission management component and the second-level institutional contract. The same goes for the hierarchical expansion case where i is greater than 2. Among them, the condition that each i-level node of the i-level institutional contract can initiate an escrow transaction is that the i-level institutional contract is in the collaboration mode at this time and the i-level node has not self-destructed.

In some embodiments, when the (i+1)-level institutional contract is in the collaboration mode, in response to a node admission transaction initiated by the initial (i+1)-level node to the (i+1)-level institutional contract, the (i+1)-level node of the (i+1)-level institutional contract is adjusted, and each (i+1)-level node has an indirect access control permission to the basic admission management component and to an institutional contract with an escrow relationship between the basic admission management component and the (i+1)-level institutional contract, and the (i+1)-level node can participate in the blockchain network.

In the present application, when i is equal to 2, the third-level institutional contract is in the collaboration mode, and the initial third-level node initiates a node admission transaction to the third-level institutional contract. The types of node admission transactions include but are not limited to adding, changing, freezing, and deleting nodes. If the node admission transaction is to add a new third-level node, each third-level node has an indirect access control permission to the basic admission management component and to a second-level institutional contract with an escrow relationship between the basic admission management component and the third-level institutional contract. The expansion of the institutional contract follows a similar pattern when i is a positive integer greater than 2.

Compared with the admission management mechanism based on the centralized CA system, the adoption of an outside-in control strategy makes the admission mechanism of the present application have better robustnees and higher security.

In some embodiments, when the i-level institutional contract is in the collaboration mode, in response to a node admission transaction initiated by the initial (i+1)-level node to the i-level institutional contract through the (i+1)-level institutional contract, an i-level node of the i-level institutional contract is adjusted.

In the present application, when i is equal to 2, the initial third-level node initiates a node admission transaction to the second-level institutional contract through the third-level institutional contract to adjust the second-level node on the second-level institution. The expansion of the institutional contract follows a similar pattern when i is a positive integer greater than 2.

In some embodiments, when the i-level institutional contract is in the collaboration mode, in response to a node admission transaction initiated by the (i+1)-level institutional contract, or by the (i+1)-level institutional contract in coordination with at least one i-level node of the i-level institutional contract to the i-level institutional contract, an i-level node of the i-level institutional contract is adjusted.

In the present application, when i is equal to 2, the second-level institutional contract is in the collaboration mode, and the third-level institutional contract can initiate a node admission transaction to the second-level institutional contract alone, or at least one third-level node in the third-level institutional contract and at least one second-level node in the second-level institutional contract can respectively initiate a node admission transaction to the second-level institutional contract to adjust the second-level node of the second-level institutional contract.

Figure 5:
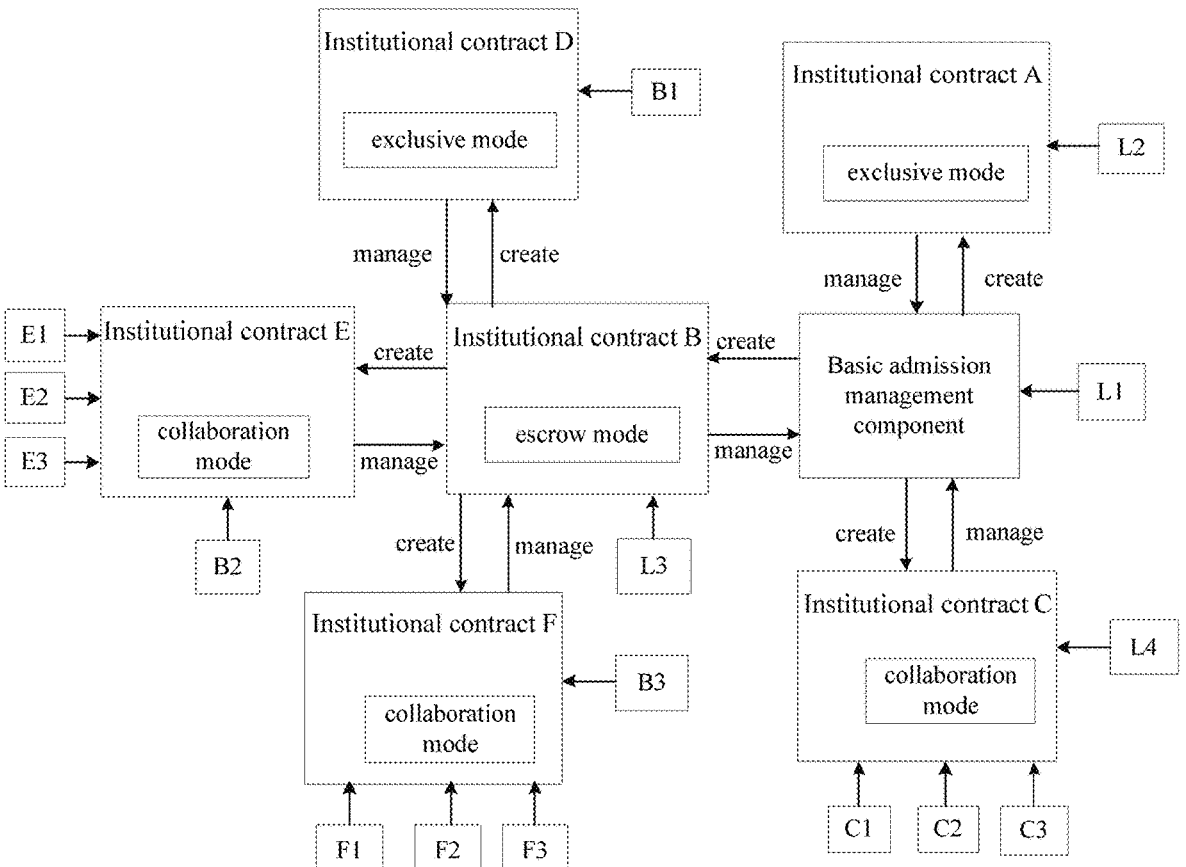
FIG. 5 is a schematic diagram of a consortium blockchain admission management architecture according to an embodiment of the present application.

Refer to FIG. 5, which is a structural diagram of a three-level architecture of consortium blockchain admission management provided by the embodiments of the present application. In the embodiments, the consortium blockchain is in a three-level admission management mode, the first-level is an admission management component, which takes a basic management component as system-level; the second-level extension institutional contracts are A, B, C, where A, B, C work in an exclusive mode, an escrow mode, and a collaboration mode respectively; the third-level extension institutional contracts are D, E, F, where D, E, F work in the exclusive mode, the collaboration mode, and the collaboration mode, respectively.

Nodes L1, L2, L3, and L4 are direct nodes of the basic management component. L2, L3, and L4 initiate escrow transactions to the basic management component, respectively. The basic management component creates institutional contracts A, B, and C for nodes L2, L3, and L4, respectively. Nodes L2, L3, and L4 are initial nodes of institutional contracts A, B, and C, respectively, also known as genesis nodes. At this time, the working modes of institutional contracts A, B, and C are all exclusive mode.

The initial node L3 of the institutional contract B initiates a node admission transaction to the institutional contract B to add a node on the institutional contract B. At this time, the institutional contract B is working in the collaboration mode and nodes B1, B2, and B3 are added.

The initial node L3 switches the collaboration mode to the escrow mode, and nodes B1, B2, and B3 initiate escrow transactions to institutional contract B, respectively. The institutional contract B creates institutional contracts D, E, and F for nodes B1, B2, and B3, respectively; nodes B1, B2, and B3 are initial nodes of institutional contracts D, E, and F, respectively.

The initial node L4 of the institutional contract C initiates a node admission transaction to the institutional contract C to add a node on the institutional contract C. At this time, institutional contract C is working in collaboration mode and nodes C1, C2, and C3 are added.

The initial node B2 of the institutional contract E initiates a node admission transaction to institutional contract E to add a node on the institutional contract E. At this time, institutional contract E is working in the collaboration mode and nodes E1, E2, and E3 are added.

The initial node B3 of the institutional contract F initiates a node admission transaction to the institutional contract F to add a node to the institutional contract F. At this time, the institutional contract F is working in the collaboration mode and nodes F1, F2, and F3 are added.

In the above admission architecture, the node L1 can directly initiate a node admission transaction to the basic management component to directly adjust the first-level node on the basic management component. The node L1 packages results of the node admission transaction, and the members in the consortium blockchain make a consensus on the results, if the consensus is successfully reached, the node admission transaction is recorded on the blockchain and applied to on a P2P network layer or a consensus layer, thereby realizing the management of the members who have reached a consensus.

The institutional contracts C, E, and F all work in collaboration mode. Taking the second-level institutional contract C as an example, for the newly added nodes C1, C2, and C3 of institutional contract C, if the newly added nodes C1, C2, and C3 have the same permissions, the nodes C1, C2, and C3 can collaborate to determine an admission type and content of the node transaction initiated by the institutional contract C to the basic admission management component. The C1 node can also initiate a node admission transaction to the basic admission management component through the institutional contract C, to adjust nodes on the basic admission management component.

At least one of the third-level nodes B2, E1, E2, and E3 on the third-level institutional contract E can initiate a node admission transaction to the second-level institutional contract B through the third-level institutional contract E to adjust the second-level nodes on the second-level institution contract.

At least one of the third-level nodes B2, E1, E2, and E3 on the third-level institutional contract E can collaborate with the second-level node L3 on the second-level institutional contract B to initiate a node admission transaction to the second-level institutional contract B, to adjust the second-level node of the second-level institutional contract B.

The above-mentioned nodes participating in the node admission transaction can package the results of the node admission transaction, and the members in the consortium blockchain will make a consensus on the results. If the consensus is successfully reached, the node admission transaction will be recorded on the blockchain and applied to the P2P network layer or the consensus layer, thereby realizing the management of members who have reached a consensus.

Through multi-level admission control management, the present application can better adapt to the hierarchical admission management needs when the scale of the organization itself and the scale of blockchain nodes expand; compared with the blockchain access control method under the traditional CA certificate system, the present application makes the admission management operation simpler through hierarchical expansion by only focusing on an organization at current-level on the blockchain; in the present application, a control strategy from the outside to the inside is adopted, resulting in a better robustness and higher security of the access management mechanism.

Figure 6:
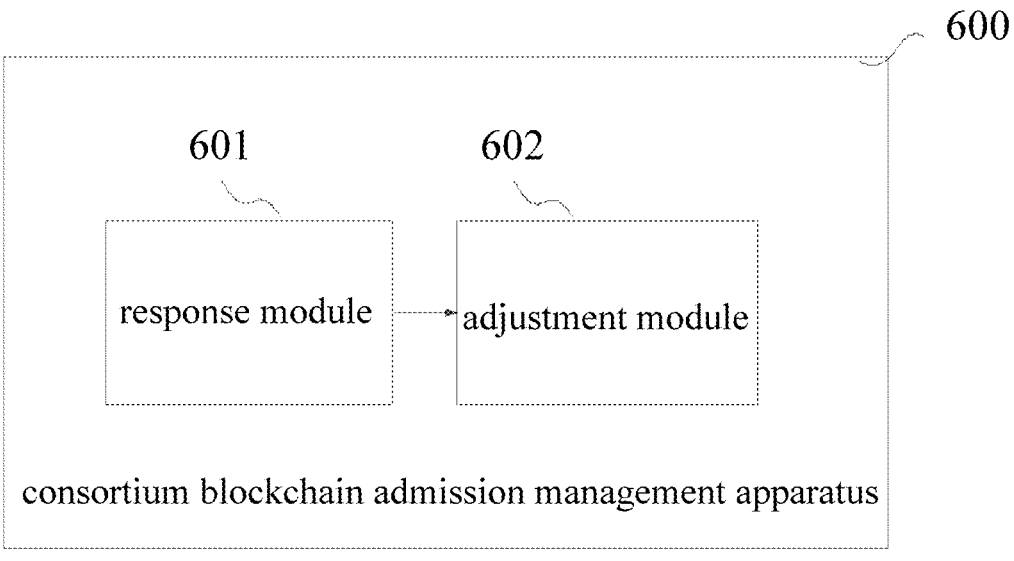
FIG. 6 is a schematic structural diagram of a consortium blockchain admission management apparatus according to an embodiment of the present application.

Based on a same technical concept, the embodiments of the present application provides a schematic structural diagram of a consortium blockchain admission management apparatus, as shown in FIG. 6, the apparatus 600 includes:

a response module 601, configured, for each first-level node having a direct access control permission to a basic admission management component, in response to an escrow transaction initiated by a first-level node to a basic admission management component, to construct a second-level institutional contract corresponding to the first-level node through the basic admission management component after a consensus is reached on the escrow transaction and the escrow transaction is recorded on the blockchain, herein the first-level node is an initial second-level node of the second-level institutional contract;

an adjustment module 602, configured, when the second-level institutional contract is in a collaboration mode, in response to a node admission transaction initiated by the initial second-level node to the second-level institutional contract, to adjust a second-level node of the second-level institutional contract. The adjust includes: adding, deleting, freezing, and unfreezing. Each second-level node has an indirect access control permission to the basic admission management component and can participate in a blockchain network. The second-level institutional contract implements multi-level node admission management through multi-level extension.

Through multi-level admission control management, the present application can better adapt to the hierarchical admission management needs when the scale of the institution itself and the scale of blockchain nodes expand; compared with the blockchain access control method under the traditional CA certificate system, the present application makes the admission management operation simpler through hierarchical expansion by only focusing on an organization at current-level on the blockchain; in the present application, a control strategy from the outside to the inside is adopted, resulting in a better robustness and higher security of the access management mechanism.

Optionally, the response module 601 is further configured to:

take, by the basic admission management component, an account of the first-level node as an initial account in an account system of the second-level institutional contract, and delete the account of the first-level node from an account system of the basic admission management component.

Optionally, the adjustment module 602 is further configured to:

for each second-level node of the second-level institutional contract, when the second-level institutional contract is in the collaboration mode, in response to a node admission transaction initiated by the second-level node to the basic admission management component through the second-level institutional contract, adjust a first-level node of the basic admission management component.

Optionally, the adjustment module 602 is further configured to:

in response to a node admission transaction initiated by the second-level institutional contract, or by the second-level institutional contract in collaboration with at least one first-level node of the basic admission management component to the basic admission management component, adjust a first-level node of the basic admission management component.

Optionally, the adjustment module 602 is further configured to:

the initial mode of the second-level institutional contract is an exclusive mode;

after in response to the escrow transaction initiated by the first-level node to the basic admission management component, construct the second-level institutional contract corresponding to the first-level node, further including:

in response to a mode switching operation initiated by the initial second-level node to the second-level institutional contract, switch from the exclusive mode to the collaboration mode or an escrow mode.

Through mode switching, institutions at all levels can carry out necessary management and control, while delegating power step by step, the potential risks brought about by the extension of layers can also be controlled.

Optionally, the adjustment module 602 is further configured to:

for each i-level node of an i-level institutional contract, when the i-level institutional contract is in an escrow mode, in response to an escrow transaction initiated by the i-level node to the i-level institutional contract, construct an (i+1)-level institutional contract corresponding to the i-level node through the i-level institutional contract, where the i-level node is an initial (i+1)-level node of the (i+1)-level institutional contract, and the initial (i+1)-level node has an indirect access control permission to the basic admission management component and a contract institution between the basic admission management component and the (i+1)-level institutional contract, and the initial (i+1)-level node is capable of participating in the blockchain network, herein i is a positive integer greater than or equal to 2.

Optionally, the adjustment module 602 is further configured to:

when the (i+1)-level institutional contract is in a collaboration mode, in response to the node admission transaction initiated by the initial (i+1)-level node to the (i+1)-level institutional contract, adjust an (i+1)-level node of the (i+1)-level institutional contract; here each (i+1)-level node has an indirect access control permission to the basic admission management component, and to an institutional contract with an escrow relationship between the basic admission management component and the (i+1)-level institutional contract, and the (i+1)-level node is capable of participating in the blockchain network.

Compared with the admission management mechanism based on the centralized CA system, the adoption of an outside-in control strategy makes the admission mechanism of the present application have better robustnees and higher security.

Optionally, the adjustment module 602 is further configured to:

when the i-level institutional contract is in the collaboration mode, in response to a node admission transaction initiated by an initial (i+1)-level node to the i-level institutional contract through the (i+1)-level institutional contract, adjust an i-level node of the i-level institutional contract.

Optionally, the adjustment module 602 is further configured to:

when the i-level institutional contract is in the collaboration mode, in response to a node admission transaction initiated by the (i+1)-level institutional contract, or by the (i+1)-level institutional contract in coordination with at least one i-level node of the i-level institutional contract to the i-level institutional contract, adjust an i-level node of the i-level institutional contract.

Figure 7:
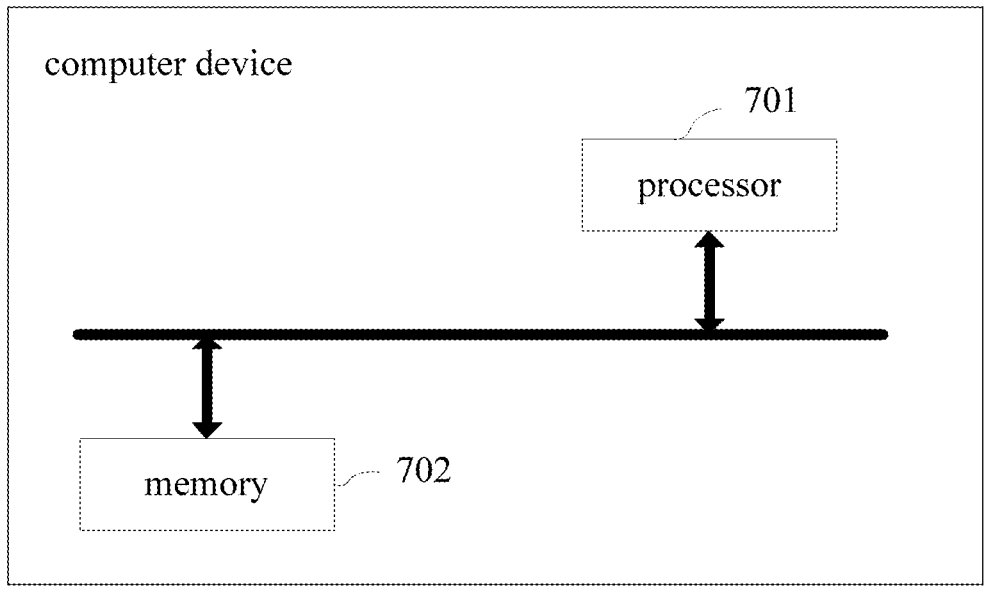
FIG. 7 is a schematic structural diagram of a computer device according to an embodiment of the present application.

Based on the same technical concept, the embodiments of the present application provides a computer device, as shown in FIG. 7, including at least one processor 701, and a memory 702 connected with the at least one processor. The embodiments of the present application do not limit the specific connection medium between the processor 701 and the memory 702. In FIG. 7, the processor 701 and the memory 702 are connected through a bus as an example. The bus can be divided into an address bus, a data bus, a control bus, etc.

In the embodiments of the present application, the memory 702 stores instructions that can be executed by the at least one processor 701, and the at least one processor 701 can execute the steps of the consortium blockchain admission management method mentioned above by executing the instructions stored in the memory 702.

Among them, the processor 701 is a control center of the computer device, and various interfaces and lines can be used to connect various parts of the computer device, and nodes can be added to the consortium blockchain by running or executing instructions stored in the memory 702 and calling the data stored in the memory 702. Optionally, the processor 701 may include one or more processing elements, and the processor 701 may integrate an application processor and a modem processor. The application processor mainly processes an operating system, a user interface, and an application program, and the modem processor mainly processes wireless communications. It is understandable that the above-mentioned modem processor may not be integrated into the processor 701. In some embodiments, the processor 701 and the memory 702 may be implemented on the same chip, and in some embodiments, they may also be implemented separately on separate chips.

The processor 701 can be a general-purpose processor, such as a central processing unit (CPU), a digital signal processor, an application-specific integrated circuit (ASIC), a field programmable gate array or other programmable logic device, a discrete gate or transistor logic device, a discrete hardware component, and can implement or execute the various methods, steps and logic block diagrams disclosed in the embodiments of the present application. A general-purpose processor can be a microprocessor or any conventional processor, etc. The steps of the method disclosed in the embodiments of the present application can be directly executed by a hardware processor, or can be executed by a combination of hardware and software modules in the processor.

The memory 702 is a non-transitory computer readable storage medium that can be used to store non-transitory software programs, non-transitory computer readable programs and modules. The memory 702 may include at least one type of storage medium, such as a flash memory, a hard disk, a multimedia card, a card-type memory, a random access memory (RAM), a static random access memory (SRAM), a programmable read-only memory (PROM), a read-only memory (ROM), an electrically erasable programmable read-only memory (EEPROM), a magnetic memory, a disk, an optical disk, etc. The memory 702 is any other medium that can be used to carry or store a desired program code in the form of an instruction or data structure and can be accessed by a computer, but is not limited thereto. The memory 702 in the embodiments of the present application can also be a circuit or any other apparatus that can realize a storage function, for storing program instructions and/or data.

Based on the same inventive concept, the embodiments of the present application provide a computer-readable storage medium, which stores a computer program that can be executed by a computer device. When the program runs on the computer device, the computer device executes the steps of the consortium blockchain admission management method mentioned above.

Those skilled in the art will appreciate that the embodiments of the present application may be provided as a method, a system, or a computer program product. Accordingly, the embodiments of the present disclosure may take the form of an entirely hardware embodiment, an entirely software embodiment, or an embodiment combining software and hardware. Moreover, the present application may adopt the form of a computer program product implemented in one or more computer-usable storage media (including but not limited to a disk storage, CD-ROM, an optical memory, etc.) that contain computer-usable program code.

The present application is described with reference to the flowcharts and/or block diagrams of a method, an apparatus (a system), and a computer program product according to the present application. It should be understood that each flow and/or block in the flow charts and/or block diagrams, as well as the combination of the flows and/or blocks in the flow charts and/or block diagrams, can be implemented by computer program instructions. These computer program instructions can be provided to a processor of a general-purpose computer, a special-purpose computer, an embedded processor, or other programmable data processing device to produce a machine, so that the instructions executed by the processor of the computer or other programmable data processing device produce an apparatus for implementing the functions specified in one or more flows of the flow charts and/or one or more blocks in the block diagram.

These computer program instructions may also be stored in a computer-readable memory that can direct a computer or other programmable data processing device to work in a specific manner, so that the instructions stored in the computer-readable memory produce a manufactured product including an instruction apparatus that implements the functions specified in one or more flows of the flow charts and/or one or more blocks of the block diagrams.

These computer program instructions may also be loaded onto a computer or other programmable data processing device so that a series of operational steps are executed on the computer or other programmable device to produce a computer-implemented process, whereby the instructions executed on the computer or other programmable device provide steps for implementing the functions specified in one or more flows of the flow charts and/or one or more blocks of the block diagrams.

Obviously, those skilled in the art can make various changes and modifications to the present application without departing from the spirit and scope of the present application. Thus, if these changes and modifications of the present application fall within the scope of the claims of the present application and their equivalents, the present application is also intended to include these changes and modifications.

What is claimed is:

1. A consortium blockchain admission management method, comprising:

for each first-level node having a direct access control permission to a basic admission management component, in response to an escrow transaction initiated by the first-level node to the basic admission management component, constructing, by the basic admission management component, a second-level institutional contract corresponding to the first-level node after a consensus is reached on the escrow transaction and the escrow transaction is recorded on a blockchain; wherein the first-level node is an initial second-level node of the second-level institutional contract;

when the second-level institutional contract is in a collaboration mode, in response to a node admission transaction initiated by the initial second-level node to the second-level institutional contract, adjusting a second-level node of the second-level institutional contract, wherein the adjusting comprises: adding, deleting, freezing, and unfreezing, and each second-level node has an indirect access control permission to the basic admission management component and is capable of participating in a blockchain network;

wherein the second-level institutional contract implements multi-level node admission management through multi-level extension.

2. The method according to claim 1, wherein, after in response to the escrow transaction initiated by the first-level node to the basic admission management component, constructing the second-level institutional contract corresponding to the first-level node through the basic admission management component, the method further comprises:

taking, by the basic admission management component, an account of the first-level node as an initial account in an account system of the second-level institutional contract, and deleting the account of the first-level node from an account system of the basic admission management component.

3. The method according to claim 1, further comprising:

for each second-level node of the second-level institutional contract, when the second-level institutional contract is in the collaboration mode, in response to a node admission transaction initiated by the second-level node to the basic admission management component through the second-level institutional contract, adjusting a first-level node of the basic admission management component.

4. The method according to claim 1, further comprising:

in response to a node admission transaction initiated by the second-level institutional contract, or by the second-level institutional contract in collaboration with at least one first-level node of the basic admission management component to the basic admission management component, adjusting a first-level node of the basic admission management component.

5. The method according to claim 3, wherein an initial mode of the second-level institutional contract is an exclusive mode;

after in response to the escrow transaction initiated by the first-level node to the basic admission management component, constructing the second-level institutional contract corresponding to the first-level node, the method further comprises:

in response to a mode switching operation initiated by the initial second-level node to the second-level institutional contract, switching from the exclusive mode to the collaboration mode or an escrow mode.

6. The method according to claim 1, wherein the second-level institutional contract implements multi-level node admission management through multi-level extension, comprises:

for each i-level node of an i-level institutional contract, when the i-level institutional contract is in an escrow mode, in response to an escrow transaction initiated by the i-level node to the i-level institutional contract, constructing an (i+1)-level institutional contract corresponding to the i-level node through the i-level institutional contract;

wherein the i-level node is an initial (i+1)-level node of the (i+1)-level institutional contract, and the initial (i+1)-level node has an indirect access control permission to the basic admission management component and a contract institution between the basic admission management component and the (i+1)-level institutional contract, and the initial (i+1)-level node is capable of participating in the blockchain network, wherein i is a positive integer greater than or equal to 2.

7. The method according to claim 6, further comprising:

when the (i+1)-level institutional contract is in the collaboration mode, in response to a node admission transaction initiated by the initial (i+1)-level node to the (i+1)-level institutional contract, adjusting an (i+1)-level node of the (i+1)-level institutional contract, wherein each (i+1)-level node has an indirect access control permission to the basic admission management component and an institutional contract with an escrow relationship between the basic admission management component and the (i+1)-level institutional contract, wherein the (i+1)-level node is capable of participating in the blockchain network.

8. The method according to claim 7, further comprising:

when the i-level institutional contract is in the collaboration mode, in response to a node admission transaction initiated by the initial (i+1)-level node to the i-level institutional contract through the (i+1)-level institutional contract, adjusting an i-level node of the i-level institutional contract.

9. The method according to claim 7, further comprising:

when the i-level institutional contract is in the collaboration mode, in response to a node admission transaction initiated by the (i+1)-level institutional contract, or by the (i+1)-level institutional contract in coordination with at least one i-level node of the i-level institutional contract to the i-level institutional contract, adjusting an i-level node of the i-level institutional contract.

10. A consortium blockchain admission management apparatus, comprising:

at least one hardware processor; and at least one memory storing instructions that, when executed by the at least hardware processor, cause the apparatus to:

for each first-level node having a direct access control permission to a basic admission management component, in response to an escrow transaction initiated by the first-level node to the basic admission management component, construct a second-level institutional contract corresponding to the first-level node through the basic admission management component after a consensus is reached on the escrow transaction and the escrow transaction is recorded on the blockchain, wherein the first-level node is an initial second-level node of the second-level institutional contract;

when the second-level institutional contract is in a collaboration mode, in response to a node admission transaction initiated by the initial second-level node to the second-level institutional contract, adjust a second-level node of the second-level institutional contract; wherein the adjust comprises: adding, deleting, freezing, and unfreezing, and each second-level node has an indirect access control permission to the basic admission management component and is capable of participating in a blockchain network; wherein the second-level institutional contract implements multi-level node admission management through multi-level extension.

11. A computer device, comprising a memory, a processor and a computer program stored in the memory and executable on the processor, wherein the processor executes the computer program to perform steps of the method according to claim 1.

12. A non-transitory computer-readable storage medium, storing a computer program executable by a computer device, and configured to enable the computer device to perform steps of the method according to claim 1 when the computer program is run on the computer device.

* * * * *